(12) United States Patent
McCormick et al.

(10) Patent No.: US 6,731,943 B1
(45) Date of Patent: May 4, 2004

(54) SYSTEM FOR EFFICIENT MOBILE SUBSCRIBER STATION PAGING IN CELLULAR MOBILE TELECOMMUNICATION NETWORKS

(75) Inventors: Mark Alan McCormick, Naperville, IL (US); Kenneth Wayne Shelhamer, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/546,248

(22) Filed: Apr. 10, 2000

(51) Int. Cl.[7] ................................. H04Q 7/20
(52) U.S. Cl. .................. 455/458; 455/411; 455/432.3; 455/433; 455/435.1
(58) Field of Search ................. 455/411, 432, 455/435, 515, 458, 434, 456, 461, 410, 425, 560, 553, 552, 551, 404.1, 404.2, 414.1–414.4, 415, 432.1–432.3, 433, 435.1–435.3, 456.1–456.6, 457, 460, 466, 550.1, 552.1

(56) References Cited

U.S. PATENT DOCUMENTS 5,826,195 A * 10/1998 Westerledge et al. ....... 455/456
5,845,203 A * 12/1998 LaDue ....................... 455/414
5,978,669 A * 11/1999 Sanmugam ................. 455/410
6,085,083 A * 7/2000 Lamb ......................... 455/410

* cited by examiner

Primary Examiner—Nay Maung
Assistant Examiner—Tanmay Lele

(57) ABSTRACT

The Mobile Subscriber Station paging system makes use of a Standalone Home Location Register SHLR, where the mobile subscriber station records are removed from the present Mobile Switching Center and placed on a processor that manages only the subscriber's records and does not process call service requests. The ANSI-41 standard is then adapted to add a new parameter (CALLTIMEFEATURE) which includes the information required to apply Short MIN paging to a mobile subscriber station when certain conditions are met. These conditions are: the mobile subscriber station is capable of responding to a Short MIN page (the last 24 bits that represent the last 7 digits of the mobile subscriber station number), and the System ID that is immutably entered into the mobile subscriber station is the same as the System ID that is being broadcast by the cell on the overhead message train. When these conditions are met, the paging message can be reduced in length by using a sub-address paging scheme to thereby diminish the control channel overhead.

24 Claims, 4 Drawing Sheets

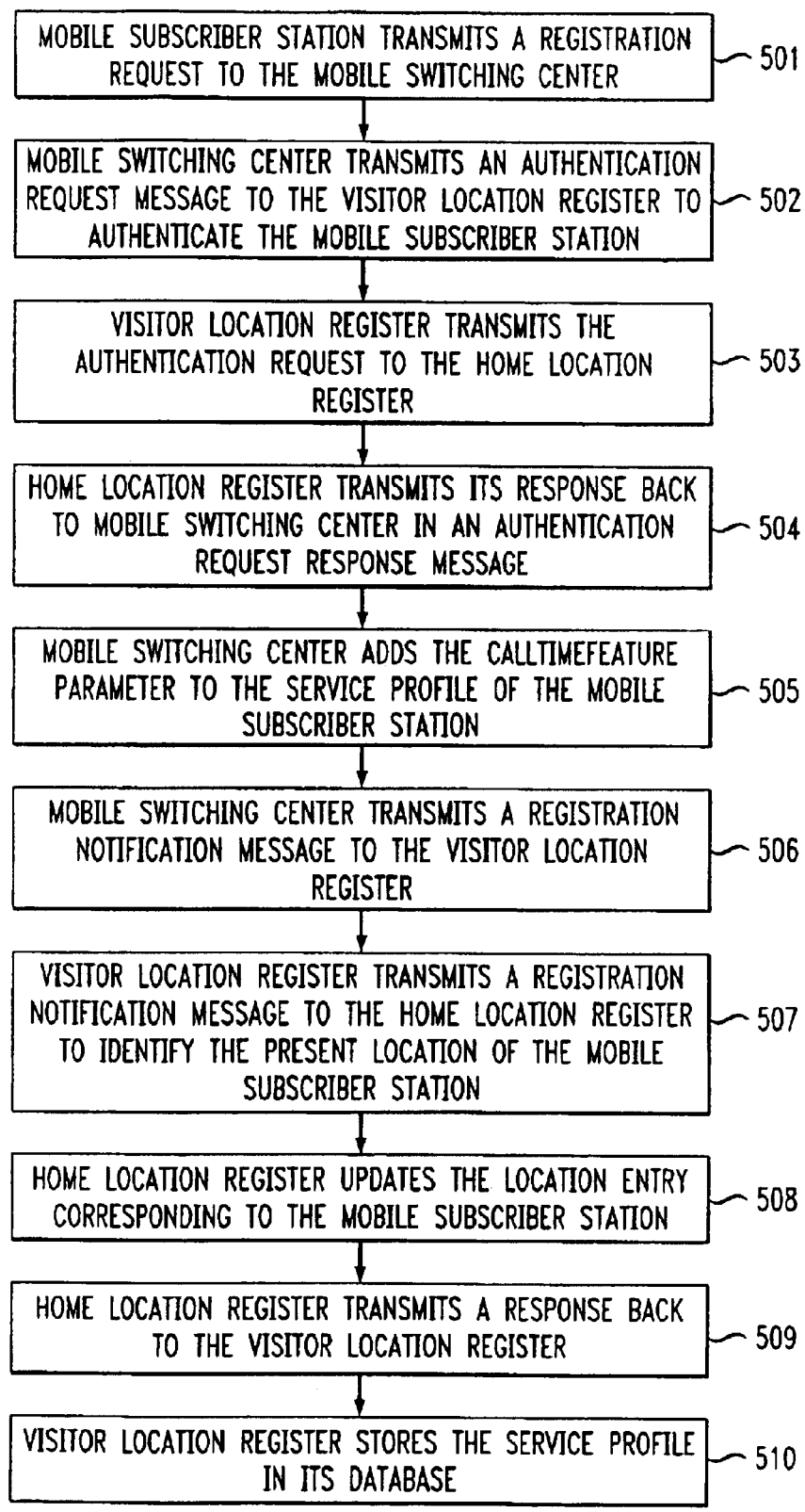

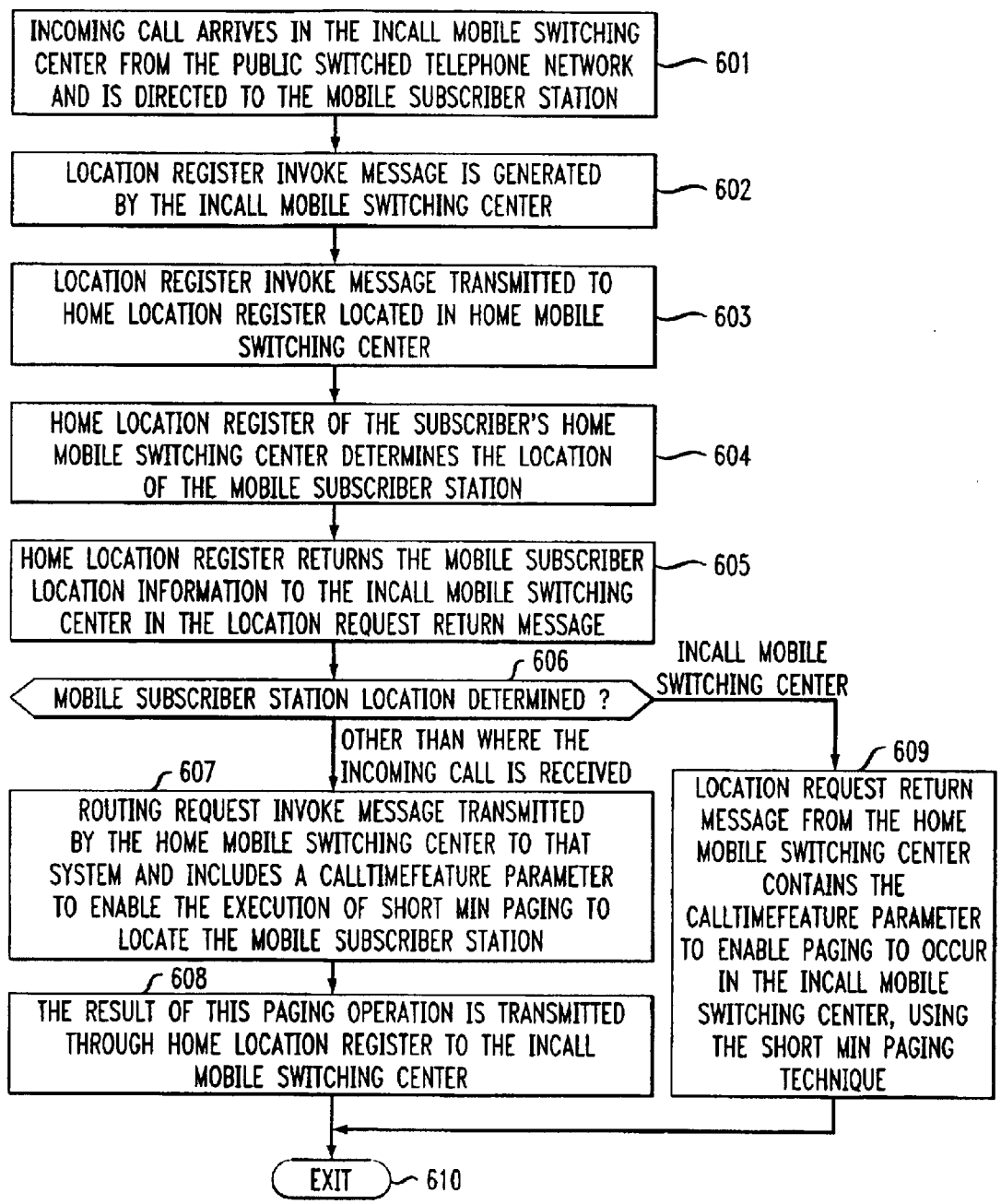

SYSTEM FOR EFFICIENT MOBILE SUBSCRIBER STATION PAGING IN CELLULAR MOBILE TELECOMMUNICATION NETWORKS

FIELD OF THE INVENTION

This invention relates to cellular mobile telecommunication networks and, in particular, to the provision of a system that enables efficient paging over the wireless communication link with the mobile wireless station set.

Problem

It is a problem in the field of cellular mobile telecommunication networks to efficiently provide paging of mobile subscriber stations, since existing protocols do not have a mechanism to address control channel overload conditions.

The processing of a service request in a cellular mobile telecommunication network requires signaling between the mobile subscriber station and the base station. In, for example, the case of a mobile subscriber station registering with a new Mobile Switching Center, messages are passed between the Message Switching Center and the associated Visitor Location Register, the Visitor Location Register and the public network Home Location Register; the Home Location Register/Visitor Location Register in the former visited service area or the mobile subscriber station's home Mobile Switching Center. The signaling message flow is illustrated in FIG. 2 for a typical ANSI-41 registration activity, focusing only on the essential elements of the message flow relating to registration. Once a terminal enters a new registration area, the mobile subscriber station transmits a registration request to the Mobile Switching Center that serves that area. The Mobile Switching Center transmits an authentication request (AUTHRQST) message to the Visitor Location Register to authenticate the mobile subscriber station which, in turn, transmits the request to the Home Location Register for this mobile subscriber station. The Home Location Register transmits its response back to the Mobile Switching Center in an authentication request response message (authrqst). Assuming that the mobile subscriber station is authenticated, the Mobile Switching Center transmits a registration notification (REGNOT) message to the Visitor Location Register. The Visitor Location Register, in turn, transmits a registration notification (REGNOT) message to the Home Location Register which serves the mobile subscriber station. The Home Location Register updates the location entry corresponding to the mobile subscriber station to point to the new serving Mobile Switching Center Visitor Location Register. The Home Location Register transmits a response back to the Visitor Location Register, which may contain relevant parts of the subscriber's service profile. The Visitor Location Register stores the service profile in its database and also responds to the serving Mobile Switching Center. If the mobile subscriber station was previously registered in a different mobile subscriber registration area, the Home Location Register transmits a registration cancellation (REGCANC) message to the previously listed Visitor Location Register. On receiving this message, the Visitor Location Register erases all entries for the terminal from the record and transmits a registration cancellation (REGCANC) message to the previously visited Mobile Switching Center, which then erases all entries for the mobile subscriber station from its memory.

Generally, mobile subscriber stations are paged in a full address mode, where the type of paging typically done in this environment is the Long or Extended Mobile Identification Number paging, which occupies a significant bandwidth in the control channel for each paging message transmitted among the system components of the cellular mobile telecommunication network. Presently, this paging operation uses the 24 bit MIN1 (NXX-XXXX) and 10 bit MIN2 (NPA), although different addressing structures are being proposed and implemented such as IMSI with digits 1–9 in the first word and digits 10–15 in the second word. Alternatively, when operating in an area that broadcasts their home System Identification (SID), mobile subscriber stations are able to be paged in a sub-address mode, using a Short MIN paging message that has been developed but is not supported by older existing cellular mobile telecommunication systems, such as those ANSI-41 compatible systems. Both of these noted paging methods work as long as the mobile subscriber station responds with the full address to itself.

Solution

The above described problems are solved and a technical advance achieved by the present Mobile Subscriber Station paging system which makes use of a Standalone Home Location Register SHLR, where the mobile subscriber station records are removed from the present Mobile Switching Center and placed on a processor that manages only the subscriber's records and does not process call service requests. The ANSI-41 standard is then adapted to add a new parameter (CALLTIMEFEATURE) which includes the information required to apply Short MIN paging to a mobile subscriber station when certain conditions are met. These conditions are: the mobile subscriber station is capable of responding to a Short MIN page (the last 24 bits that represent the last 7 digits of the mobile subscriber station number), and the System ID that is immutably entered into the mobile subscriber station is the same as the System ID that is being broadcast by the cell on the overhead message train. When these conditions are met, the paging message can be reduced in length by using a sub-address paging scheme to thereby diminish the control channel overhead. Thus, the last known location of the mobile subscriber station is used in conjunction with the CALLTIMEFEATURE parameter to minimize the length of the paging message. The mobile subscriber station need not be uniquely identified with the complete Mobile Identification Number if its location is known.

BRIEF DESCRIPTION OF THE DRAWINGS

FIG. 5 illustrates in flow diagram form, the operation of the present Mobile Subscriber Station paging system in processing a mobile subscriber station registration; and FIG. 6 illustrates in flow diagram form, the operation of the present Mobile Subscriber Station paging system in processing an incoming call to a mobile subscriber station.

Figure 1:
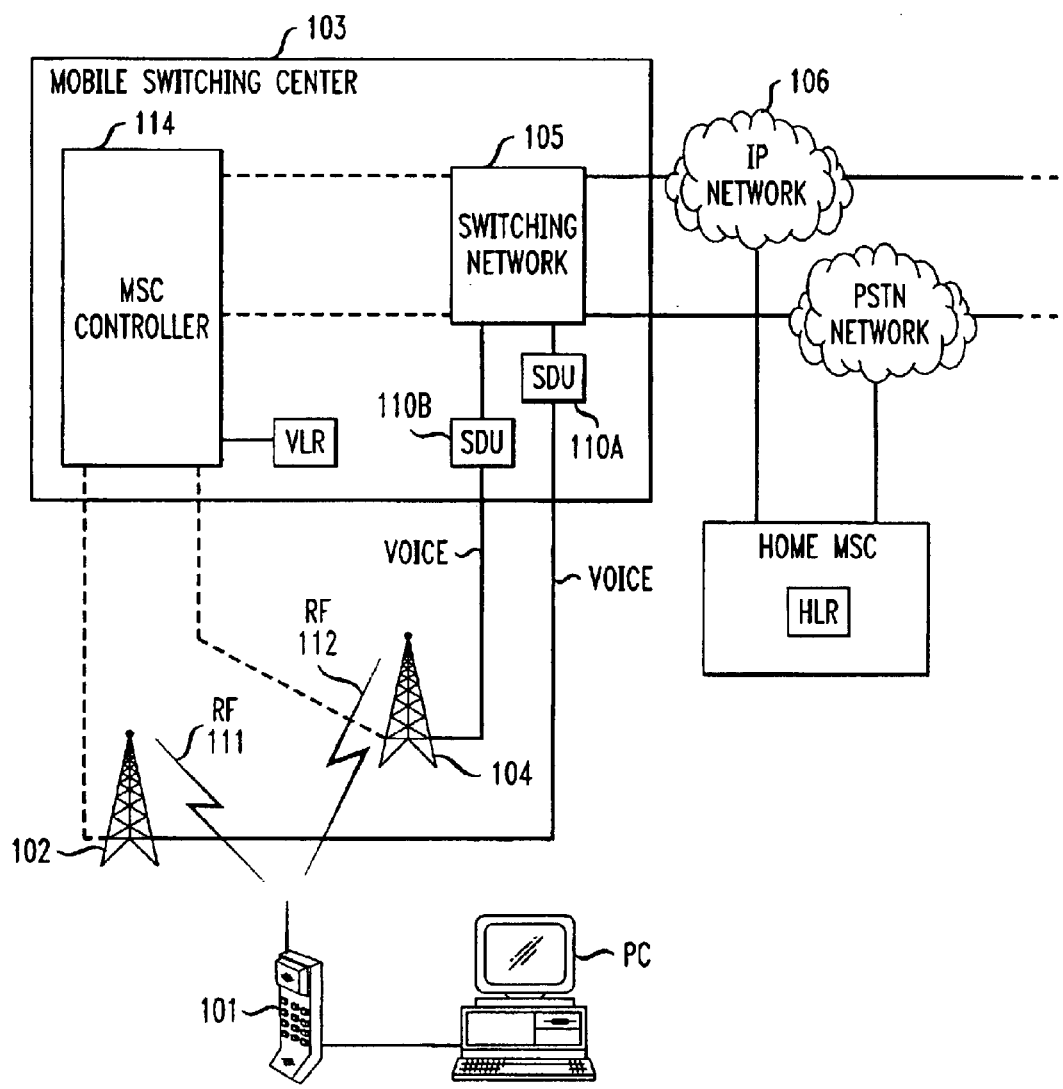
FIG. 1 illustrate the overall architecture of a cellular mobile telecommunication network in which the present Mobile Subscriber Station paging system is implemented.

DETAILED DESCRIPTION OF THE DRAWINGS
Network Architecture

In cellular mobile telecommunication systems, the mobile wireless station set communicates with the local serving base station as well as adjacent base stations. The base stations are connected to a mobile switching center through a network interface. Each mobile wireless station set includes a mobile termination that serves to provide the radio link functionality and terminal equipment that comprises the subscriber's terminal equipment, such as a telephone station set, fax machine, personal computer, and the like. The mobile termination supports the physical channel between the mobile wireless station set and the base station, including: radio transmissions, radio channel management, channel coding/decoding, speech encoding/decoding, and the like. The base station itself comprises a plurality of base transceiver stations that serve to provide the radio link functionality, and a base station controller. The cellular mobile telecommunication network implements logical traffic and control channels for carrying subscriber communications data (voice and data traffic) and call control signals, respectively. The logical traffic and control channels are mapped on to physical channels on the radio link. The logical control channels carry signaling and synchronization data over one of the four types of control channels: Broadcast Control Channel (BCCH), Common Control Channel (CCCH), Digital Control Channel (DCCH), Analog Control Channel (ACCH).

There are a number of second generation wireless technologies that are presently in use. In particular, the Interim Standard 136 (IS-136) air interface for mobile cellular communications uses Time Division Multiple Access (TDMA) in the 800 MHz band. The Global System for Mobile Communications GSM is the present European standard for mobile cellular communications and operates in the 900-MHz frequency band and is based on Time Division Multiple Access (TDMA). The Interim Standard 95 (IS-95) air interface for mobile cellular communications uses Code Division Multiple Access (CDMA) in the 800 MHz band. These existing systems typically use a 9.6 Kbs voice data channel and the transmission of data at higher speeds entails the assignment of multiple simultaneous voice channels to a subscriber to achieve higher data transmission rates. In order to accommodate data transmission on the wireless radio links, the IS-95 standard specifies a CDMA-based data service which is based on standard data protocols, to the greatest extend possible. For example, the physical layer of the IS-95 protocol stack is adopted for the physical layer of the data services, with the provision of a Radio Link Protocol overlay. However, the effectiveness of this solution is limited by the signaling overhead required to support this protocol.

With CDMA systems, a plurality of transmitter-receiver pairs share a common frequency pair. This is made possible by the orthogonal coding that is inherent with CDMA. The first stage of a cellular communications connection is executed when a transmitter-receiver pair at the base station, operating on a predetermined pair of radio frequencies, is activated and a mobile subscriber station is tuned to the same pair of radio frequencies. The second stage of the communication connection is executed at the mobile switching office during which the call path is extended to outgoing or incoming trunks to the common carrier public telephone network. At this point in time, the call is considered as being established. The mobile switching center contains a switching network to switch mobile customer's voice and/or data signals from the communication link to an incoming or outgoing trunk. The cellular mobile telecommunication system is controlled by a mobile telecommunication controller at or remotely connected to each base station associated with the mobile switching center. A plurality of data links connect the mobile telecommunication controller and the associated base station controllers. The mobile telecommunication controller operates under control of complex software and controls the switching network. The mobile telecommunication controller also controls the actions of the associated base station controllers by generating and interpreting the control messages that are exchanged with the associated base station controllers over the data links. The base station controllers at each base station, in response to control messages from the mobile telecommunication controller, control the assignment of transmitter-receiver pairs at the base station. The control processes at each base station also control the tuning of the mobile subscriber stations to the selected radio frequency.

Cellular Mobile Telecommunication System Architecture

FIG. 1 is the block diagram of the architecture of one example of an existing cellular mobile telecommunication system in which the present Mobile Subscriber Station paging system is implemented. In the description of the disclosed invention, the major entities are the mobile subscriber station 101, base stations 102 and 104, and the Mobile Switching Center 103. The Mobile Switching Center 103 contains a mobile telecommunication controller 114 which controls the operation of Switching Network 105 to provide the telephone connectivity between base stations 102 and 104 and to Public Switched Telephone Network PSTN and data communication network 106. Base stations 102 and 104 are connected to the Switching Network 105 through cell site nodes (CSN) 110A, 110B. The mobile switching center 103 has additional functionality such as billing, administration, and maintenance, requiring additional entities. However, the corresponding description of these entities are not essential to the embodiment of the disclosed invention. Base stations 102 and 104 communicate with mobile subscriber station 101 using RF channels 111 and 112, respectively. RF channels 111 and 112 convey both command messages as well as data, which may represent voice signals being articulated at the mobile subscriber station 101 and the far-end party. With a CDMA system, the mobile subscriber station communicates with at least one base station 102. In FIG. 1, the mobile subscriber station 101 is simultaneously communicating with two base stations 102, 104, thus constituting a soft handoff. However, a soft handoff is not limited to a maximum of two base stations. Standard EIA/TIA IS-95-B supports a soft handoff with as many as six base stations. When in a soft handoff, the base stations serving a given call must act in concert so that commands issued over RF channels 111 and 112 are consistent with each other. In order to accomplish this consistency, one of the serving base stations may operate as the primary base station with respect to the other serving base stations. The base stations communicate with other base stations through the cell site nodes 110A, 110B. Of course, a mobile subscriber station 101 may communicate with only a single base station if determined as sufficient by the wireless communications system.

The control channels that are available in this cellular mobile telecommunication system are used to setup the communication connections between the mobile subscriber stations 101 and the base station 102. When a call is initiated, the control channel is used to communicate between the mobile subscriber station 101 involved in the call and the local serving base station 102. The control messages locate and identify the mobile subscriber station 101, determine the dialed number, and identify an available voice/data communication channel consisting of a pair of radio frequencies and orthogonal coding which is selected by the base station 102 for the communication connection. The radio unit in the mobile subscriber station 101 retunes the transmitter-receiver equipment contained therein to use these designated radio frequencies and orthogonal coding. Once the communication connection is established, the control messages are typically transmitted to adjust transmitter power and/or to change the transmission channel when required to handoff this mobile subscriber station 101 to an adjacent cell, when the subscriber moves from the present cell to one of the adjoining cells. The transmitter power of the mobile subscriber station 101 is regulated since the magnitude of the signal received at the base station 102 is a function of the mobile subscriber station transmitter power and the distance from the base station 102. Therefore, by scaling the transmitter power to correspond to the distance from the base station 102, the received signal magnitude can be maintained within a predetermined range of values to ensure accurate signal reception without interfering with other transmissions in the cell.

Figure 3:
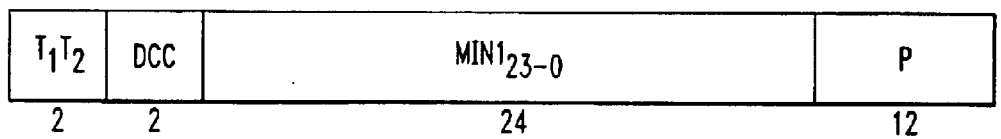
FIG. 3 illustrates the format of an Abbreviated Address Word used in the control channel of an existing cellular mobile telecommunication networks.
Figure 4:
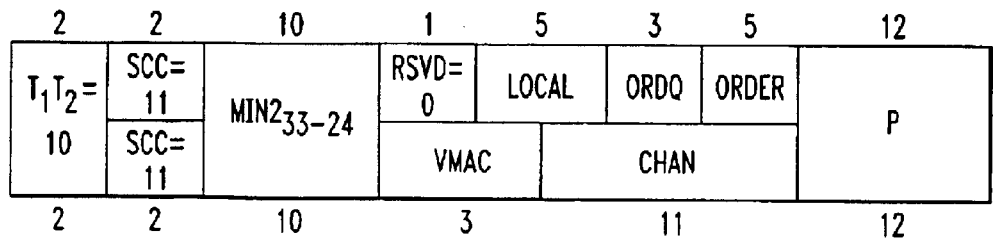
FIG. 4 illustrates the format of an Extended Address Word used in the control channel of an existing cellular mobile telecommunication networks.

The control channels in a cellular mobile telecommunication network provide a predetermined traffic capacity due to the physical limits of the data transmission rate of the control channel. In particular, the existing mobile subscriber station identification messages includes the 34 bit Mobile Identification Number: MIN1–MPA 24 bits+MIN2–10 bits. Therefore, the existing radio page requires 2 radio link words. The Short MIN paging message uses the last 24 bits of the Mobile Identification Number that represent the last 7 digits of the mobile subscriber station number and can be packaged into one radio link word. FIG. 3 illustrates the format of an Abbreviated Address Word used in the control channel of an existing cellular mobile telecommunication networks and FIG. 4 illustrates the format of an Extended Address Word used in the control channel of an existing cellular mobile telecommunication networks. In particular, the format of an Abbreviated Address Word consists of a Type field of two bits, where the Type field defines the length of the message, with '00' indicating a single Word message, '01' indicating a multiple Word message, where the Type bits are set to '10' in each subsequent Word of the message. The DCC two bit field consists of a digital color code field. The next 24 bits consist of the first part (MIN1) of the Mobile Identification Number field. Finally, a parity field of 12 bits is appended to the Mobile Identification Number field to complete the Abbreviated Address Word. The Extended Address Word consists of two words, each of which include a Type field of two bits which are set to '10' as noted above and a two bit SAT color code of '11'. The next ten bits consist of the second part (MIN2) of the Mobile Identification Number field. The next section of the Word consists of predetermined control fields as are specified in the EIA-533 Standards. Finally, a parity field of 12 bits is appended to this field to complete the Extended Address Word.

The mobile subscriber station responds to the Short MIN message if the mobile subscriber station is in the home market area or an area that looks like the home market area, by the use of the Visitor Location Register as described below. This system can be used in many mobile subscriber station paging operations, such as for:

display update on the screen of the mobile subscriber station display text on the screen of the mobile subscriber station caller ID for display on the screen of the mobile subscriber station program the mobile subscriber station over the air activation of the mobile subscriber station authentication of the mobile subscriber station Uniquely ID mobile subscriber station Message Flow for Call Service Requests The processing of a service request in a cellular mobile telecommunication network requires signaling between the mobile subscriber station 101 and the base station 102. In, for example, the case of a mobile subscriber station 101 registering with a new (Visited) Mobile Switching Center 103, messages are passed between the Visited Mobile Switching Center 103 and the associated Visitor Location Register, the Visitor Location Register and the public network Home Location Register; the Home Location Register/Visitor Location Register in the former visited service area or the mobile subscriber station's Home Mobile Switching Center. FIG. 5 illustrates in flow diagram form, the operation of the present Mobile Subscriber Station paging system in processing a mobile subscriber station registration.

A mobile subscriber station 101 accesses a Mobile Switching Center through either Autonomous Registration, Origination or Termination. The Mobile Switching Center 103, in response to a mobile subscriber station 101 initiating a registration process, transmits a Registration Notification Invoke message to the Home Location Register of the mobile subscriber station 101. In response to receipt of a Registration Notification Invoke message at the Home Mobile Switching Center, the CALLTIMEFEATURE parameter is added to the service profile of the mobile subscriber station 101. The serving Mobile Switching Center then creates a Visitor Location Register entry with the information received in the registration notification return result.

Figure 2:
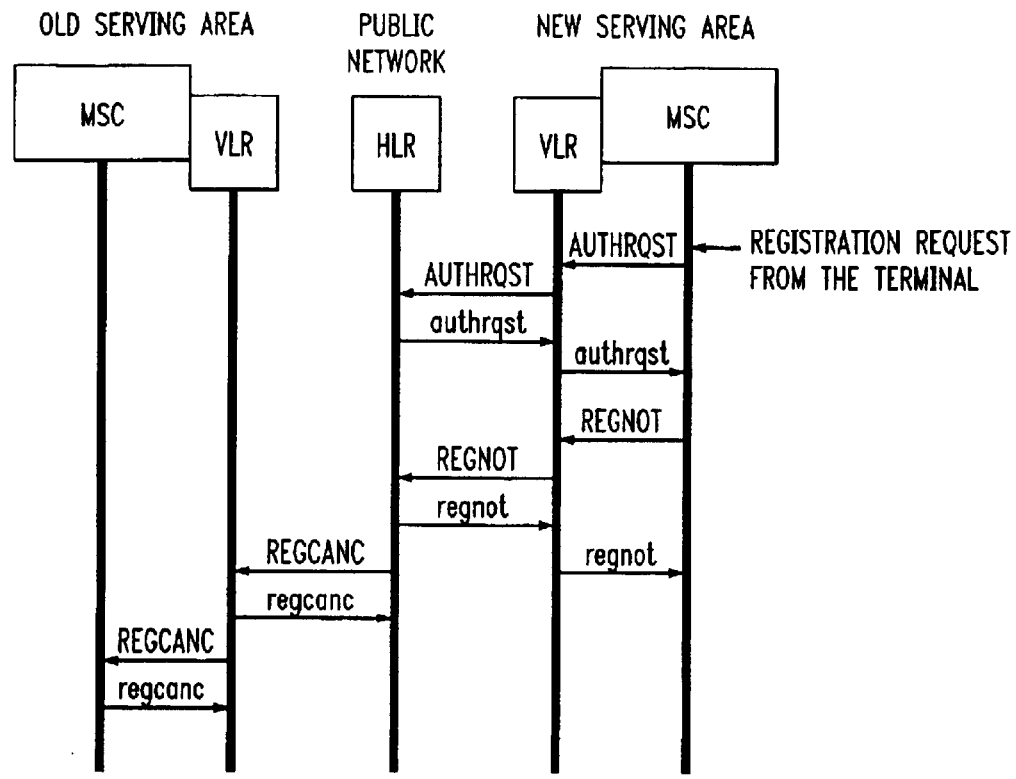
FIG. 2 illustrates the message flow of a control channel message exchange in an existing cellular mobile telecommunication networks.

The signaling message flow is illustrated in FIG. 2 for a typical ANSI-41 registration activity, focusing only on the essential elements of the message flow relating to registration. Once a mobile subscriber station 101 enters a new registration area, the mobile subscriber station 101 at step 501 transmits a registration request to the Mobile Switching Center 103 that serves that area. The Mobile Switching Center 103 at step 502 transmits an authentication request (AUTHRQST) message to the Visitor Location Register to authenticate the mobile subscriber station 101 which, in turn, transmits the request at step 503 to the Home Location Register for this mobile subscriber station 101. The Home Location Register transmits its response back to the Mobile Switching Center 103 at step 504 in an authentication request response message (authrqst). Assuming that the mobile subscriber station is authenticated, the Mobile Switching Center adds the CALLTIMEFEATURE parameter to the service profile of the mobile subscriber station 101 at step 505 and transmits a registration notification (REGNOT) message to the Visitor Location Register at step 506. The Visitor Location Register, in turn, transmits a registration notification (REGNOT) message to the Home Location Register which serves the mobile subscriber station 101 to identify the present location of the mobile subscriber station 101 at step 507. The Home Location Register updates the location entry corresponding to the mobile subscriber station 101 at step 508 to point to the new serving Mobile Switching Center Visitor Location Register. The Home Location Register at step 509 transmits a response back to the Visitor Location Register, which may contain relevant parts of the subscriber's service profile. The Visitor Location Register at step 510 stores the service profile in its database and also responds to the serving Mobile Switching Center.

If the mobile subscriber station was previously registered in a different mobile subscriber registration area, the Home Location Register transmits a registration cancellation (REGCANC) message to the previously listed Visitor Location Register. On receiving this message, the Visitor Location Register erases all entries for the terminal from the record and transmits a registration cancellation (REGCANC) message to the previously visited Mobile Switching Center, which then erases all entries for the mobile subscriber station from its memory.

Incoming Call to a Mobile Subscriber Station Example

FIG. 6 illustrates in flow diagram form, the operation of the present Mobile Subscriber Station paging system in processing an incoming call to a mobile subscriber station. An incoming call arrives in the Mobile Switching Center (Incall Mobile Switching Center) at step 601 from the Public Switched Telephone Network and is directed to the mobile subscriber station 101. The Location Register Invoke message is generated by the Incall Mobile Switching Center at step 602 and transmitted to the Home Location Register that is located in the Home Mobile Switching Center of the mobile subscriber station 101 at step 603. The Home Location Register of the subscriber's Home Mobile Switching Center determines the location of the mobile subscriber station 101 at step 604 via the presently available ANSI-41 implementations and returns the mobile subscriber location information to the Incall Mobile Switching Center in the Location Request Return message at step 605. If the mobile subscriber station 101 is last known to be in a location other than where the incoming call is received as determined at step 606, a Routing Request Invoke message is transmitted at step 607 by the Home Mobile Switching Center that supports the Home Location Register to that system and includes a CALLTIMEFEATURE parameter to enable the execution of Short MIN paging to locate the mobile subscriber station 101. The result of this paging operation is transmitted through the Home Location Register to the Incall Mobile Switching Center at step 608. If the mobile subscriber station was last seen at the Incall Mobile Switching Center, the Location Request Return message form the home Mobile Switching Center contains the CALLTIMEFEATURE parameter to enable paging to occur in the Incall Mobile Switching Center, using the Short MIN paging technique at step 609 and exits at step 610.

Summary

The Mobile Subscriber Station paging system reduces the paging message in length to thereby diminish the control channel overhead. The last known location of the mobile subscriber station is used in conjunction with the CALLTIMEFEATURE parameter to minimize the length of the paging message that is used to access the mobile subscriber station.

What is claimed:

1. A mobile subscriber station paging system located in a cellular mobile telecommunication network for providing a reduced length paging message on the control channel of the radio link that interconnects a mobile wireless station set with said cellular mobile telecommunication network, comprising:

means, responsive to a subscriber at said mobile wireless station set requesting registration with said cellular mobile telecommunication network, for transmitting an authentication request message to a visitor location register of a mobile switching center of said cellular mobile telecommunication network that serves said mobile wireless station set to authenticate said mobile subscriber station;

means for forwarding said authentication request to a home location register of said mobile subscriber station; and means, located in said home location register for adding a parameter to a service profile of said mobile subscriber station, for indicating that said mobile subscriber station is located in said serving mobile switching center to enable short MIN paging of said mobile wireless station set in said serving mobile switching center.

2. The mobile subscriber station paging system of claim 1 wherein said means for indicating comprises:

means for transmitting a registration notification message from said mobile switching center to said visitor location register; and means for transmitting a registration notification message from said visitor location register to said home location register to identify a present location of said mobile subscriber station.

3. The mobile subscriber station paging system of claim 2 wherein said means for indicating further comprises:

means for updating the location entry corresponding to said mobile subscriber station in said home location register.

4. The mobile subscriber station paging system of claim 2 wherein said means for indicating further comprises:

means for transmitting a service profile of said mobile subscriber station to said visitor location register.

5. The mobile subscriber station paging system of claim 1 further comprising:

means, responsive to receipt of an incoming call at said mobile switching center, for transmitting a request to said home location register to locate said mobile subscriber station.

6. The mobile subscriber station paging system of claim 1 further comprising:

means for determining a location of said mobile subscriber station.

7. The mobile subscriber station paging system of claim 1 further comprising:

means for returning mobile subscriber location Information to said mobile switching center.

8. The mobile subscriber station paging system of claim 1 further comprising:

means for executing a sub-address paging process to locate said mobile subscriber station.

9. A method of paging a mobile subscriber station served by a cellular mobile telecommunication network for providing a reduced length paging message on the control channel of the radio link that interconnects a mobile wireless station set with said cellular mobile telecommunication network, comprising the steps of:

transmitting, in response to a subscriber at said mobile wireless station set requesting registration with said cellular mobile telecommunication network, an authentication request message to a visitor location register of a mobile switching center of said cellular mobile telecommunication network that serves said mobile wireless station set to authenticate said mobile subscriber station;

forwarding said authentication request to a home location register of said mobile subscriber station; and adding a parameter to a service profile of said mobile subscriber station, for indicating that said mobile subscriber station is located in said serving mobile switching center to enable short MIN paging of said mobile wireless station set in said serving mobile switching center.

10. The method of paging a mobile subscriber station of claim 9 wherein said step of indicating comprises:

transmitting a registration notification message from said mobile switching center to said visitor location register; and transmitting a registration notification message from said visitor location register to said home location register to identify a present location of said mobile subscriber station.

11. The method of paging a mobile subscriber station of claim 10 wherein said step of indicating further comprises:

updating the location entry corresponding to said mobile subscriber station in said home location register.

12. The method of paging a mobile subscriber station of claim 10 wherein said step of indicating further comprises the step of:

transmitting a service profile of said mobile subscriber station to said visitor location register.

13. The method of paging a mobile subscriber station of claim 9 further comprising the step of:

transmitting, in response to receipt of an incoming call at said mobile switching center, a request to said home location register to locate said mobile subscriber station.

14. The method of paging a mobile subscriber station of claim 9 further comprising the step of:

determining a location of said mobile subscriber station.

15. The method of paging a mobile subscriber station of claim 9 further comprising the step of:

returning mobile subscriber location information to said mobile switching center.

16. The method of paging a mobile subscriber station of claim 9 further comprising the step of:

executing a sub-address paging process to locate said mobile subscriber station.

17. A system for paging a mobile subscriber station served by a cellular mobile telecommunication network by providing a reduced length paging message on the control channel of the radio link that interconnects a mobile wireless station set with said cellular mobile telecommunication network, comprising:

authentication request message transmitting means, responsive to a subscriber at said mobile wireless station set requesting registration with said cellular mobile telecommunication network, for transmitting an authentication request message to a visitor location register of a mobile switching center of said cellular mobile telecommunication network that serves said mobile wireless station set to authenticate said mobile subscriber station;

message forwarding means for forwarding said authentication request to a home location register of said mobile subscriber station; and mobile subscriber station location identification means for adding a parameter to a service profile of said mobile subscriber station, for indicating that said mobile subscriber station is located in said serving mobile switching center to enable short MIN paging of said mobile wireless station set in said serving mobile switching center.

18. The system for paging a mobile subscriber station of claim 17 wherein said mobile subscriber station location identification means comprises:

visitor location register notification means for transmitting a registration notification message from said mobile switching center to said visitor location register; and home location register notification means for transmitting a registration notification message from said visitor location register to said home location register to identify a present location of said mobile subscriber station.

19. The system for paging a mobile subscriber station of claim 18 wherein said mobile subscriber station location identification means further comprises:

home location register update means for updating the location entry corresponding to said mobile subscriber station in said home location register.

20. The system for paging a mobile subscriber station of claim 18 wherein said mobile subscriber station location identification means further comprises the step of:

visitor location register update means for transmitting a service profile of said mobile subscriber station to said visitor location register.

21. The system for paging a mobile subscriber station of claim 17 further comprising:

subscriber locating means for transmitting, in response to receipt of an incoming call at said mobile switching center, a request to said home location register to locate said mobile subscriber station.

22. The system for paging a mobile subscriber station of claim 17 further comprising:

mobile subscriber station location determining means for determining a location of said mobile subscriber station.

23. The system for paging a mobile subscriber station of claim 17 further comprising:

mobile subscriber station location means for returning mobile subscriber station location information to said mobile switching center.

24. The system for paging a mobile subscriber station of claim 17 further comprising:

Paging means for executing a sub-address paging process to locate said mobile subscriber station.

* * * * *